United States Patent [19] Basiulis

[11] 3,924,674
[45] Dec. 9, 1975

[54] HEAT VALVE DEVICE

[75] Inventor: Algerd Basiulis, Redondo Beach, Calif.

[73] Assignee: Hughes Aircraft Company, Culver City, Calif.

[22] Filed: Nov. 7, 1972

[21] Appl. No.: 304,421

[52] U.S. Cl. .................... 165/32; 165/105
[51] Int. Cl.$^2$ .................... F28D 15/00
[58] Field of Search .................... 165/105, 32, 96

[56] References Cited

UNITED STATES PATENTS

| | | | |
|---|---|---|---|
| 3,517,730 | 6/1970 | Wyatt | 165/105 X |
| 3,525,386 | 8/1970 | Grover | 165/105 X |
| 3,621,906 | 11/1971 | Leffert | 165/105 X |
| 3,702,533 | 11/1972 | Dirne et al. | 165/105 X |
| 3,776,304 | 12/1973 | Auerbach | 165/105 X |
| 3,782,449 | 1/1974 | Busse et al. | 165/105 X |

*Primary Examiner*—Albert W. Davis, Jr.
*Attorney, Agent, or Firm*—R. A. Cardenas; W. H. MacAllister

[57] ABSTRACT

Heat valve devices especially suitable for controlling heat flow from a heat source to a heat sink are disclosed. These devices each include an elongated tubular housing of low thermal conductivity being closed at both ends. A capillary wick lining the inner lateral surface of the housing is adapted to convey a volatile working fluid such as water from one end to the other. A sealed working fluid reservoir adapted to being heated is in fluid communication with the housing.

3 Claims, 4 Drawing Figures

HEAT VALVE DEVICE

FIELD OF THE INVENTION

This invention relates generally to heat pipes and more particularly to a heat valve capable of interrupting the flow of heat from a heat source to a heat sink based upon the temperature of the source and the vapor pressure within the heat valve.

DESCRIPTION OF THE PRIOR ART

Certain heat transfer applications require that heat flow from a heat source to a heat sink be interrupted for any of a number of reasons. The heat source may be an electronic component, assembly or any device that develops heat that must be dissipated for proper operation. The heat sink may be any conductive, convective or radiation device.

Generally, heat flow from a heat source to a heat sink will continue so long as there is a temperature gradient between the two. In other words, if the heat source is at a higher temperature than the heat sink, there will be heat flow from the former to the latter. It may be desired to maintain a heat source at a certain minimum operating temperature. This may be difficult to maintain if there is a large temperature gradient between the source and the sink. The source may soon drop below the desired minimum. To prevent this drop below operating temperature, it may be necessary to interrupt the heat flow from the source. One way to interrupt this flow would be to decrease the temperature gradient by heating the heat sink or by physically disconnecting the source and sink. Both of these methods are generally impractical.

Another problem is encountered when a heat sink may become exposed to temperatures that are higher than the heat source. In effect, the source and sink exchange functions to the detriment of the already hot components since heat will be pumped into the hot components rather than away.

One may also wish to switch a heat source from one heat sink to another, depending on the temperature of the respective heat sinks.

In the prior art there have been inefficient and impractical methods of interrupting or switching heat flow from a heat source to a heat sink.

SUMMARY OF THE INVENTION

Accordingly, it is an object of the present invention to provide a simple and reliable heat switch for controlling the heat transfer from a heat source to a heat sink.

It is a further object of the present invention to provide a heat switch useful in directing the heat flow from a heat source to a heat sink.

It is a still further object of the present invention to provide a heat switch that is activated at a predetermined temperature.

It is another object of the present invention to provide a heat switch that is activated at a predetermined vapor pressure.

It is another object of the present invention to provide a heat valve that has no moving parts.

In accordance with the foregoing objects, a heat transfer device according to the invention includes a sealed housing of low thermal conductivity material. A capillary wick is disposed within the housing for conveying a volatile working fluid from the vicinity of one end of the housing to the vicinity of the other end. Sufficient volatile working fluid is provided to fill the void wick volume. A working fluid reservoir is provided in fluid communication with the working fluid in the housing and is of sufficient volume that the working fluid may be contained therein.

The foregoing and other objects and features of the present invention will become readily apparent from the following detailed description of preferred embodiments of the invention when considered in conjunction with the accompanying drawings.

Figures 1, 2:
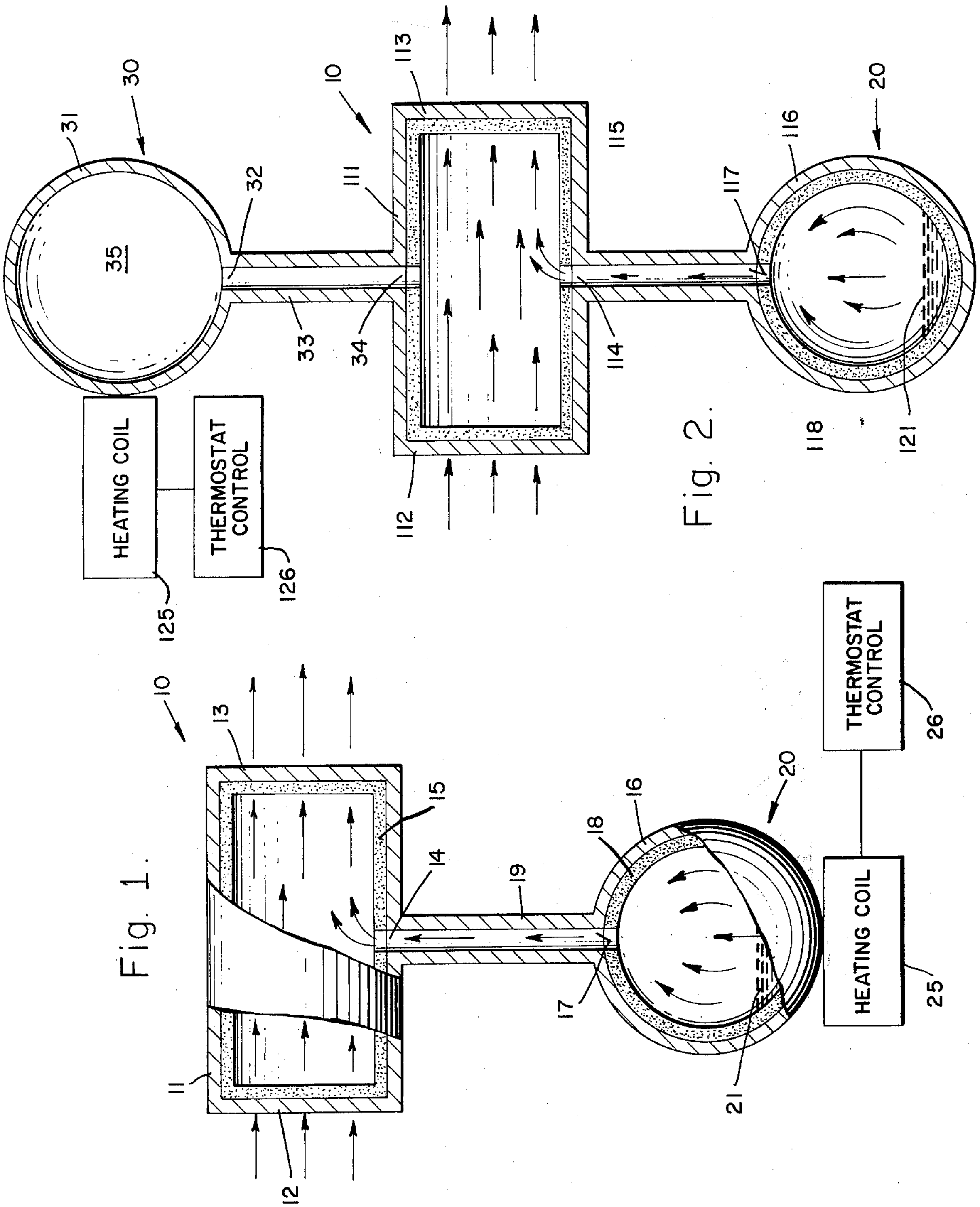
FIG. 1 is a longitudinal, partially sectional view illustrating a heat valve device according to one embodiment of the present invention.
FIG. 2 is a longitudinal sectional view illustrating a heat valve device according to another embodiment of the present invention.

Referring more specifically to FIG. 1, a heat valve device according to the invention may be seen to include a switch section 10, which functions as a heat pipe, in fluid communication with a working fluid reservoir 20 via an umbilical tube 19.

The switch section 10 includes an elongated tubular housing 11 being hermetically sealed at both ends 12 and 13 and having an opening 14 along the lateral surface. The housing 11 is preferably of a low thermal conductivity material such as stainless steel or glass, for example. The sealed end 12 is an evaporation region to which external heat may be applied to vaporize a working fluid. The sealed end 13 is a condensation region where the vaporized working fluid loses its latent heat of vaporization and condenses at this slightly cooler region where that heat may be disposed of.

In the alternative, the sealed end 12 may be the condensation region while the sealed end 13 may be the evaporation region if the sealed end 12 is at a slightly lower temperature than sealed end 13.

A capillary wick 15, preferably of low thermal conductivity material, lines the inner surfaces of the housing 11 and the ends 12 and 13. The wick may be made of any material having a sufficient void volume through which a working fluid travels by capillary action, for example felt cloth, stainless steel screen, sintered metal fibers and spun glass. In the alternative, other wick arrangements such as a plurality of longitudinally extending wick strips circumferentially spaced along the inner surface of the housing 10 may be employed. The wick 15 may be attached to the housing 11 by any of the commonly known methods of sintering, brazing, etc.

The volatile working fluid reservoir 20 may take any convenient shape such as sphere as illustrated in FIG. 1. The working fluid reservoir 20 includes a spherical member 16, preferably of a low thermal conductivity material such as stainless steel or glass, having an opening 17. The sphere 16 may be formed of two hemispheres that are joined together, for example. The reservoir 20 must be capable of containing all the working fluid that is contained in the void wick volume of the capillary wick 15 within the switch section 10 as is explained below. The reservoir 20 will contain substantially all the working fluid when the switch section 10 is off.

Alternatively, any other conveniently shaped container may be used as a reservoir 20, including a cubic shape, a cylinder, etc.

The interior surface of the reservoir 20 may include a low thermal conductivity capillary wick 18 similar to the wick 15 within the switch section 10. The wick 18 would shorten the switch-off time of the heat transfer device, that is, the time interval between operation at full capacity and being off. As the vaporized working fluid enters the reservoir 20 and contacts a lower temperature, the fluid will condense and be readily captured by the capillary wick 18.

The working fluid reservoir 20 is adapted to be heated for increasing the working fluid 21 vapor pressure, which increased pressure drives the working fluid 21 out of the reservoir 20. The reservoir 20 may be heated by a passive heat source such as the sun, a hot electronic component, etc. An active heat source may also be used, including a heating coil 25 that is regulated by a thermostat 26 to maintain a predetermined temperature. Other suitable means may be used for increasing the vapor pressure of the working fluid in the reservoir 20.

The switch section 10 and the working fluid reservoir 20 are in fluid communication and hermetically sealed together via an umbilical tube 19. One end of the umbilical tube 19 is sealed to the opening 14 in the housing 11 and the other end is sealed to the opening 17 in the sphere 16. The umbilical tube 19 may be of a low thermal conductivity material such as stainless steel or glass.

The heat valve device also contains sufficient volatile working fluid 21 to fill the void wick volume of the capillary wick 15 in the switch section 10 usually at one atmosphere of pressure. The volatile working fluid 21 may be chosen from a number of suitable fluids, depending on the desired temperature range, a few of which are listed below with their respective operating ranges:

| Working Fluid | Approximate Useful Temperature Range, °C. |
|---|---|
| Dowtherm A | 150–350 |
| CP-63 | 150–350 |
| CP-9 | 150–350 |
| FC43 | 120–220 |
| Dowcorning 200 | 100–200 |
| Freon 13 | 20– 75 |
| Freon 12 | −28– 38 |
| Water | 75–150 |
| Ammonia | −39– 22 |

The above working fluids are readily available commercially and are manufactured by companies such as the Dow Chemical Company, Minnesota Mining and Manufacturing Co., E. I. Du Pont de Nemours, and the Monsanto Co. It should be understood that the above list is only exemplary as to suitable working fluids and temperatures for a heat valve according to the invention.

The device in FIG. 1 also has a closed opening (not shown) for inserting the volatile working fluid 21 after the device has been manufactured.

The switch section 10 is on when the volatile working fluid 21 is in the switch section 10, transporting heat from the evaporation region 12 to the condensation region 13. In the off condition, the working fluid 21 is contained in the working fluid reservoir 20.

For purposes of illustration, it will be assumed that the heat valve of FIG. 1 has a working fluid 21 that vaporizes at 100°C at 1 atmosphere of pressure, such as water, for example. It is also assumed that the evaporation region 12 is in thermal contact with a heat source at 100°C, and the condensation region 13 is in thermal contact with a heat sink at a lower temperature.

The operation of the heat transfer device of FIG. 1 begins initially with the switch section 10 in the off or non-heat-conducting mode, and substantially all the working fluid 21 is in the working fluid reservoir 20. The reservoir 20 will be at some temperature lower than 100°C. During this off condition, heat may be applied to the evaporation region 12 without having that heat transferred to the condensation region 13 because there is no working fluid to transport the heat within the switch section 10. Very little heat is transmitted through the housing 11 or the capillary wick 15 by conduction since preferably both the housing 11 and the wick 15 are made of low thermal conductivity material as explained above.

With the switch section 10 off and with heat being applied to the evaporation region 12, there is a very small amount of vaporized working fluid within the housing 11 in a superheated condition and under increased pressure. The term superheated refers to a vapor whose temperature is in excess of the saturated vapor temperature at the same pressure. The increased pressure of the superheated vapor, being greater than the vapor pressure of working fluid 12 within the cooler reservoir 20, keeps the cooler working fluid vapor 21 in the reservoir 20. Superheated vapor is also a poor working fluid medium for transporting heat from one region to another, since there are relatively few molecules to carry the heat in comparison with a working fluid at its vaporization temperature.

The switching point, i.e., when the switch section 10 conducts heat, is governed by the relative temperatures and pressures of the switch section 10 and the working fluid reservoir 20 so that by controlling the temperature and consequently the pressure of the reservoir 20 one controls the switching point.

The evaporation region 12 is in thermal contact with a heat source and control heat is applied to the working fluid reservoir 20. As heat is applied, the working fluid vaporizes causing an increase in pressure within the reservoir 20. If the temperature of the reservoir 20 exceeds the temperature of the evaporation region 12, the pressure also of the reservoir 20 exceeds that of the switch section 10. When the pressure within the working fluid reservoir 20 exceeds the pressure of the superheated vapor in the switch section 10 substantially all the working fluid 21 will be driven out of the reservoir 20 and into the switch section 10 via the umbilical tube 19. The vapor flows to the cooler condensation region 13 where it condenses and is conveyed along the capillary wick 15. Since both the superheated vapor in the switch section 10 and the vapor in the reservoir 20 obey (approximately) Boyle's law:

$$PV = KT$$

where $P$ = pressure;

$V$ = volume (constant here);

$K$ = a constant; and $T$ = temperature;

the reservoir 20 pressure will exceed the switch section 10 pressure whenever the reservoir 20 temperature exceeds the switch section 10 temperature.

As the fluid 21 reaches the evaporation region 12 via the capillary wick 15, it is vaporized by absorbing its latent heat of vaporization from the heated region 12. There is a slight increase in pressure at the evaporization region 11 as the working fluid 21 vaporizes and thereby causes the vapor to flow toward the condensation region 13 where the pressure is slightly lower. The condensation region 13 is maintained at a lower temperature than the evaporization region 12 by any appropriate way such as using a heat sink, a blower, etc. When the vaporized fluid comes within the condensation region 13, it loses it latent heat of vaporization to that region. The vapor condenses, falling back to the capillary wick 15 to be captured by it and transported back to the evaporation region 12 by capillary action to begin the whole process again.

The device is said to be in the on or heat-conducting mode when heat is being transferred between the evaporation region 12 and the condensation region 13.

It is also pointed out that the switch section 10 contains substantially all the volatile working fluid and will be in the on or heat conducting mode whenever the fluid reservoir 20 temperature is above the evaporation region 12 temperature. The switch section 10 need not be at the vaporization temperature of the volatile working fluid 21.

As explained above, the control heat that is applied to the fluid reservoir 20 may be regulated by any convenient means, such means being either active or passive heat sources. The main requirement for the control-heat source is that it be of sufficiently high temperature that the switch section 10 be activated, vis-a-vis, the reservoir 20 temperature must be slightly higher than the switch section 10 temperature during switch section 10 operation.

As long as the temperature of the reservoir 20 is maintained slightly above the temperature of the evaporization region 12, the heat valve device will be on. The device is switched off by lowering the temperature of the working fluid reservoir 20 causing reduced temperature and pressure within the reservoir 20. This reduction in temperature and pressure causes the working fluid to be drawn into the reservoir 20. As the vapor enters the cooler reservoir regions, it will condense and be captured by the capillary wick 18 which may optionally line the interior surfaces of the reservoir 20. With the working fluid 21 in the reservoir 20, the switch section 10 cannot operate as a heat pipe and the device is effectively switched off.

Figure 3:
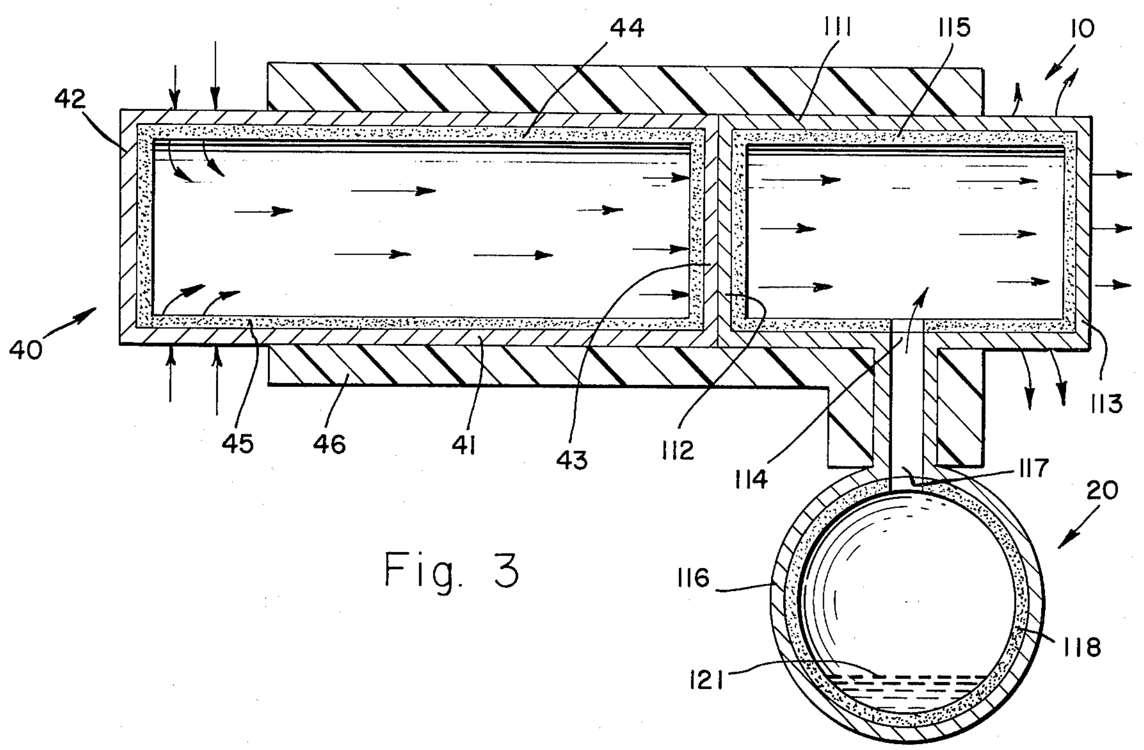
FIG. 3 is a longitudinal sectional view illustrating a heat valve device according to still another embodiment of the present invention.
Figure 4:
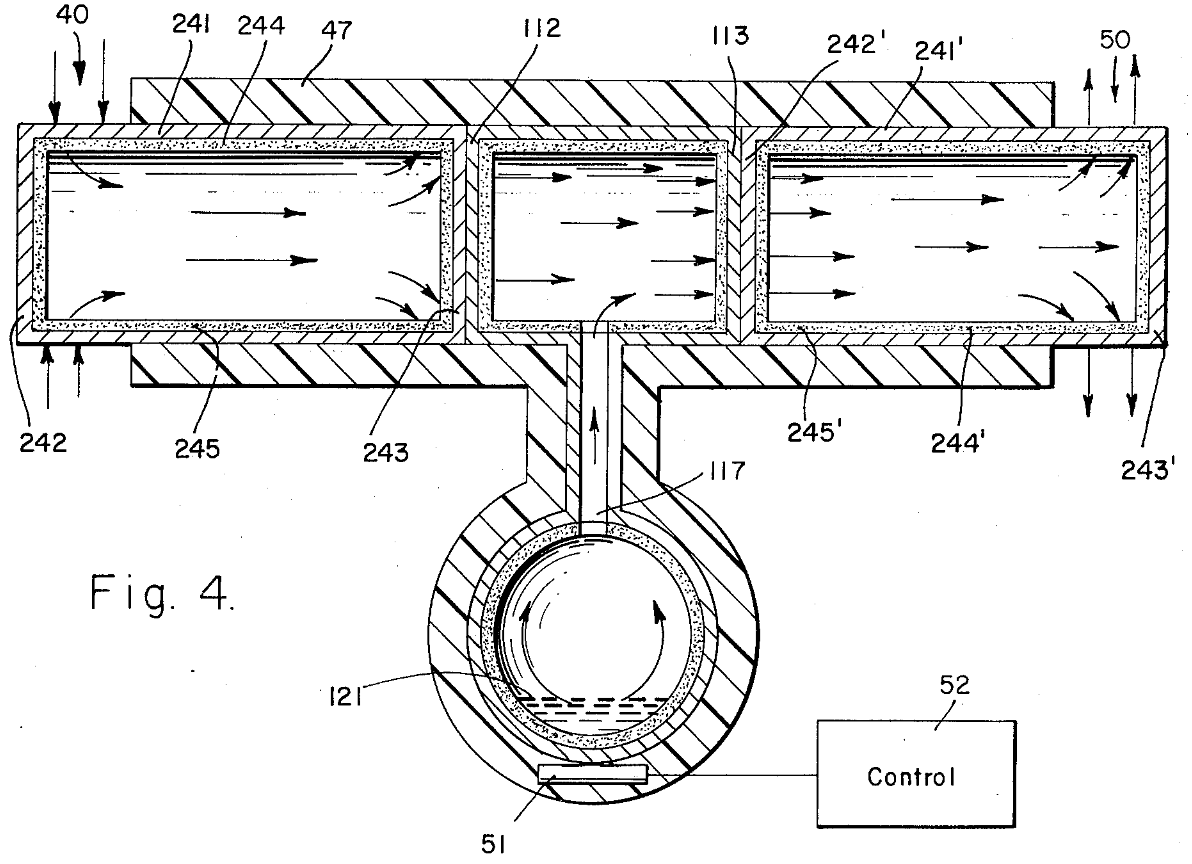
FIG. 4 is a longitudinal sectional view illustrating a heat valve device according to a farther embodiment of the present invention.

A heat transfer device according to other embodiments of the present invention is illustrated in FIGS. 2, 3, and 4. Components in the embodiments of FIGS. 2, 3, and 4 which are similar to respective components in the embodiment of FIG. 1 are designated by the same reference numerals as their corresponding components in FIG. 1 except for the addition of a prefix numeral 1.

The heat valve device of FIG. 2 is similar to the embodiment of FIG. 1 with an inert gas reservoir 30 added that is in fluid communication with a switch 10 via an umbilical tube 33, and an inert gas 35.

The inert gas reservoir 30 includes a spherical housing 31 preferably of low thermal conductivity material having an opening 32. The gas reservoir may be made of two hemispheres joined together. Any other convenient configuration may be used as a gas reservoir including a cubic or cylindrical shaped container. The gas reservoir 30 may also be constructed capable of varying the pressure of a contained gas by varying the volume and/or temperature. The temperature of the inert gas 35 in the reservoir 30 may be controlled by a heating coil 125 coupled to a thermostat control 126, for example. Such a variable volume reservoir may include a system of bellows. A passive bellows reservoir may also be used to negate any variation in the inert gas pressure by allowing the reservoir 30 to expand so as to maintain a constant pressure.

The switch section 10 of this second embodiment has an opening 34 in the housing 111 through which the inert gas reservoir 30 and the section 10 are in fluid communication via the umbilical tube 33. One end of the umbilical tube 33 is hermetically sealed about the opening 32 in the spherical member 31, and the other end is hermetically sealed to the opening 34 in the housing 111.

The inert gas reservoir 30 and the switch section 10 contain a non-condensible inert gas 35 at a predetermined pressure. The gas 35 in the switch section 10 prevents heat transfer between the regions 112 and 113 while the switch section is in the off mode and the working fluid 121 is in the working fluid reservoir 20. The pressure of the inert gas 35 determines to a large extent when the switching point will occur. That is, the working fluid 121 must have a vapor pressure slightly in excess of the inert gas 35 pressure before the gas 35 will be displaced in the switch section 10 by the working fluid 121.

The term "non-condensible" is used in the context of being non-condensible over the operating range of the working fluid 121. Or in other words, the inert gas 35 is condensible only at a temperature sufficiently below the operating temperature range of the working fluid such that no gas 35 condenses out while in that temperature range.

The pressure of the inert gas 35 is dependent upon the working fluid 121 being used and upon the desired switching point. Various working fluids have different vapor pressures at a given atmospheric pressure and heating these fluids to a given temperature will result in different vapor pressures. A working fluid having a low vapor pressure must be heated to a higher temperature than a working fluid having a higher vapor pressure in order to attain a given pressure so as to displace an inert gas 35 at a given pressure from a switch section 10. Conversely, a given working fluid having a particular vapor pressure at a given atmospheric perssure must be heated to a higher temperature if it is to displace an inert gas 35 having a higher pressure.

A sample of typical non-condensible inert gases that may be used include argon, neon, helium nitrogen, hydrogen, etc.

The device of FIG. 2 also has a closed opening (not shown) through which the working fluid 121 and the inert gas 35 are inserted after the device has been manufactured.

As described under FIG. 1, the heat valve device of FIG. 2 will operate in the heat transfer mode only when the working fluid 121 is within the switch section 10. Unlike the embodiment of FIG. 1, in this second embodiment the inert gas 35 must be displaced by the working fluid 121 in order that the switch section 10 be switched on. The inert gas displacement does not occur, however, until the vapor pressure of the working fluid 121 is greater than the pressure of the inert gas 35.

As in the first embodiment the fluid reservoir 20 is heated to force the working fluid 121 out of the reservoir 20 and into the switch section 10. The inert gas 35 is therefore displaced from the switch section 10 into the gas reservoir 30 through the umbilical tube 33 by the working fluid 121.

Given a particular working fluid having a particular vapor pressure, the switching point is determined by the pressure of the inert gas 35 notwithstanding the temperature and the evaporization region 112 as in the case of the first embodiment. It should be recalled that the switching point of the first embodiment occurs when the temperature of the fluid reservoir 20 is higher than the evaporation region 12 temperature. The switching point of this second embodiment may be controlled with a high degree of accuracy by controlling the pressure of the inert gas 35 which in turn controls the switching point.

For example, assume that water is the working fluid 121 and argon at 1 atmosphere of pressure is the inert gas 35. It is further assumed that the gas reservoir 30 is of sufficient volume that as the gas 35 is displaced from the housing 111 there will be a negligible increase in pressure within the gas reservoir 30. Under these conditions, the water will have a vapor pressure of 1 atmosphere when the fluid reservoir 20 is at a temperature of 100°C. The switching point occurs at a pressure slightly in excess of 1 atmosphere and that water vapor pressure occurs when the water temperature is slightly above 100°C. For purposes of discussion, however, the switching point will be assumed to be equal to the inert gas 35 pressure.

Assume now that a different switching point, either higher or lower than 100°C, is desired. That switching point will be attained by varying the pressure of the inert gas 35. Let's say that a switching point of 144°C is desired. Since water has a vapor pressure of approximately 4 atmospheres at 144°C, the inert gas 35 must be at a pressure of 4 atmospheres for the desired switching point. Suppose now that a switching point less than 100°C is desired, for example, 75°C. At 75°C water has a vapor pressure of 0.38 atmospheres and therefore the inert gas 35 must have the same pressure.

It is therefore apparent that the switching point may be determined with a high degree of accuracy by controlling the pressure of the inert gas 35.

The switching point may also be varied by varying the volume of the gas reservoir 30. One convenient method for varying the volume is by the use of a bellows. A piston and cylinder arrangement may also be used to vary the volume of the gas reservoir 30 and correspondingly varying the pressure.

Since the inert gas may be described by Boyle's law, by varying the volume the pressure is either increased or decreased. The varied pressure causes a corresponding increase or decrease in the temperature that the working fluid 121 must reach before switching takes place.

Referring now to FIG. 3, a heat valve device as described in FIG. 1 is depicted in combination with a conventional heat pipe. The heat pipe 40 has a thermal interface with the switch section 10 at the evaporation region 111 and is used as a heat input to the switch section.

The conventional heat pipe 40 includes a typical thin-walled elongated tubular housing 41 being sealed at both ends 42 and 43. A low thermal conductivity material such as stainless steel or glass may be used for the housing 41. One sealed end of the housing 41 functions as an evaporation region 42 and the other sealed end functions as a condensation region 43. The interior lateral surface of the housing 41 is lined with a capillary wick 44 as described above for FIG. 1. A volatile working fluid 45 fills the void wick volume of the capillary wick 44 and the heat pipe 40 is hermetically sealed. The working fluids, as described above for FIG. 1, in the heat pipe 40 and the heat valve, are preferably, although not necessarily, the same so that the operating ranges are the same.

A substantial portion of the heat pipe-heat valve combination may be covered by a layer 46 of insulating material such as polyurethane foam or multifoil superinsulation for minimal heat loss. In the alternate, an evacuated stainless steel envelope may be used for insulation. The insulating layer 46 preferably covers all of the surfaces except for the evaporation region 42 of the heat pipe 40, the condensation region 113 of the switch section 10 and a portion of the fluid reservoir 20 if a passive control heat source is used requiring exposure of the reservoir 20 to the heat source.

It is pointed out that the heat valve portion of this embodiment which includes switch section 10 and fluid reservoir RO may also include a gas reservoir and an inert gas similar to the gas reservoir 30 and inert gas 35 of FIG. 2.

The heat transfer device of FIG. 3 operates essentially the same as the embodiment of FIG. 1. In the embodiment of FIG. 3 the heat source is a distance away from the heat valve, which heat is brought to the switch section 10 via a heat pipe 40.

The heat pipe functions as most conventional heat pipes. Heat is applied externally at the evaporation region 42 causing the working fluid 45 to be evaporated within the housing 41. The increased pressure at the evaporation region 42 drives the vaporized working fluid 45 toward the condensation region 43. If the condensation region 43 is at a lower temperature than the evaporation region 42, the vapor upon reaching that region will lose its latent heat of vaporization, condense and be captured by the capillary wick 44. The working fluid 45 is then transported back to the evaporization region 42 to begin the cycle again.

The heat released at the heat pipe 40 condensation region 43 is conducted from that region to the evaporation region 112 of the heat valve through the thermal interface between these two regions.

If the temperature of the working fluid reservoir 20 is greater than the temperature of the evaporization region 112 in the switch section 10, the working fluid vapor 121 will be driven into the switch section 10. When the working fluid 121 is in the switch section 10, heat will be transported from the evaporation region 112 to the condensation region 113 by the working fluid 121. The vaporized working fluid 121 loses its latent heat of vaporization to the cooler condensation region 113. The vapor condenses, is captured by the capillary wick and is conveyed back to the evaporation region 112. The heat absorbed by the condensation region 113 may then be removed from that region to an appropriate heat sink by conduction, radiation or convection. The heat pipe-heat valve combination under the above-named conditions makes a complete heat circuit from a heat source to a heat sink.

If, on the other hand, the temperature at the evaporation region 112 is higher than the temperature of the working fluid reservoir 20, the fluid remains in the fluid reservoir 20 and the heat valve is off or in a non-conducting state. In this non-conducting state, there is an open circuit at the heat valve so that heat is not conducted from the heat source to the heat sink as was explained above.

Components in the embodiment of FIG. 4 which are similar to respective components in the embodiment of FIG. 3 are designated by the same reference numerals as their corresponding components in FIG. 3, except for the addition of a prefix numeral 2. Components that are duplicates of other components in FIG. 4 are designated by the same reference numerals except that the duplicates have primed "′" numerals.

Referring now to FIG. 4, a heat transfer device utilizing a heat valve and two heat pipes is described. The heat transfer device of FIG. 4 is similar to the device depicted in FIG. 3 with the addition of a second heat pipe 50, having its evaporation region 242′ in thermal contact with the condensation region 113 of the switch section 10. The second heat pipe 50 may be structurally and functionally the same as the first heat pipe 40 as described above. This combination may also be substantially thermally insulated with an insulation layer 47 while leaving the evaporation region 242′ of the first heat pipe 40, the condensation region 243′ of the second heat pipe 50, and possibly the fluid reservoir 20 exposed.

A heater 51 is in thermal contact with the working fluid reservoir 20 for heating the working fluid 121. A control unit 52 is coupled to the heater 51 for controlling the heater 51 temperature.

It should be noted that the heat valve portion of this embodiment including switch section 10 and fluid reservoir 20 may also include a gas reservoir and inert gas similar to the gas reservoir 30 and the inert gas 35 of FIG. 2.

In operation the heat transfer device of FIG. 4 is substantially similar to the operation of the device embodied in FIG. 3. There is heat input from a heat source to the evaporation region of the first heat pipe 40; then there is vaporization followed by condensation of the working fluid 245 at the condensation region 243. The condensed working fluid 245 goes back to the evaporation region 242 by capillary action along the wick 244. Heat from the condensation region 243 is conducted to the evaporation region 112 of the switch section 10 through the thermal interface of these two regions.

The condensation region 113 of the switch section 10 forms a second thermal interface with the second heat pipe 50 for conveying heat to the second heat pipe 50.

The second heat pipe 50 functions the same as the first heat pipe 40. There is vaporization of a volatile working fluid 245′ at the evaporation region 242′. The vapor travels to the condensation region 243′ where it loses its latent heat of vaporization and condenses. The heat released by the working fluid 245′ may then be conveyed to a suitable heat sink while the condensed working fluid 245′ is conveyed back to the evaporation region by capillary action along the wick 244′.

The heat valve portion of this heat transfer device will conduct heat from its evaporation region 112 to its condensation region 113 if the temperature of the working fluid reservoir 20 is higher than the evaporation region 112. The control heat to the reservoir 20 is supplied by the heater 51 which is activated by the control unit 52. A complete thermal circuit between a heat source and a heat sink is made when the heat valve is in the heat conducting mode. Conversely, there is an open circuit when the heat valve is not conducting.

It should be apparent from the foregoing that the present invention provides a simple and reliable heat switching device. Moreover, the device may be switched on and off at an accurate predetermined temperature. In fact, a heat transfer device according to FIG. 4 has been constructed and tested. Although the device was constructed without efficient thermal insulation, it was found to transfer 90 watts of power from a heat source to a heat sink while only 10 watts of power were used to heat the reservoir 20. It is believed that with proper super-insulation the same 90 watts may be transferred with as little as 1 watt of control heat power.

Although the present invention has been shown and described with reference to particular embodiments, nevertheless, various changes and modifications obvious to one skilled in the art to which the invention pertains are deemed to lie within the purview of the invention.

I claim:

1. A heat switching device having first and second states comprising:

a housing of low thermal conductivity having a first heat transfer region and a second heat transfer region, said housing containing a gas during said first state and containing a fluid during said second state;

capillary means having a void volume and disposed within said housing for conveying a fluid between said heat transfer regions during said second state;

a fluid reservoir for containing a fluid during said first state;

means hermetically sealing said fluid reservoir to said housing for providing fluid communication therebetween;

a volatile working fluid in said fluid reservoir during said first state and being sufficient to fill the void volume of said capillary means during said second state;

a gas reservoir;

means hermetically sealing said gas reservoir to said housing for providing fluid communication therebetween;

an inert gas being non-condensible in said first and second states being at a predetermined pressure within said gas reservoir and said housing for preventing transfer of heat between said heat transfer regions during said first state and being displaceable from said housing into said gas reservoir by increasing the vapor pressure of said volatile working fluid above said predetermined gas pressure in said second state; and, means coupled to said gas reservoir for varying the inert gas pressure therein and varying the switching point from said first state to said second state.

2. A heat switching device having first and second states comprising:

a housing of low thermal conductivity having a first heat transfer region and a second heat transfer region, said housing containing a gas during said first state and containing a fluid during said second state;

capillary means having a void volume and disposed within said housing for conveying a fluid between said heat transfer regions during said second state;

a fluid reservoir for containing a fluid during said first state;

means hermetically sealing said fluid reservoir to said housing for providing fluid communication therebetween;

a volatile working fluid in said fluid reservoir during said first state and being sufficient to fill the void volume of said capillary means during said second state;

a gas reservoir;

means hermetically sealing said gas reservoir to said housing for providing fluid communication therebetween;

an inert gas being non-condensible in said first and second states being at a predetermined pressure within said gas reservoir and said housing for preventing transfer of heat between said heat transfer regions during said first state and being displaceable from said housing into said gas reservoir by increasing the vapor pressure of said volatile working fluid above said predetermined gas pressure in said second state;

said first and second states having a predetermined switching point; and, means coupled to said gas reservoir for varying the inert gas pressure therein and varying the switching point from said first state to said second state.

3. A heat switching device having first and second states comprising:

a housing of low thermal conductivity having a first heat transfer region and a second heat transfer region, said housing containing a gas during said first state and containing a fluid during said second state;

means coupled to said first heat transfer region for thermal transfer therebetween;

means coupled to said second heat transfer region for thermal transfer therebetween;

capillary means having a void volume and disposed within said housing for conveying a fluid between said heat transfer regions during said second state;

a fluid reservoir for containing a fluid during said first state;

means hermetically sealing said fluid reservoir to said housing for providing fluid communication therebetween;

a volatile working fluid in said fluid reservoir during said first state and being sufficient to fill the void volume of said capillary means during said second state;

a gas reservoir;

means hermetically sealing said gas reservoir to said housing for providing fluid communication therebetween;

an inert gas being non-condensible in said first and second states and having a predetermined pressure within said gas reservoir and said housing for preventing transfer of heat between said heat transfer regions during said first state and being displaceable from said housing into said gas reservoir by increasing the vapor pressure of said volatile working fluid above said predetermined gas pressure in said second state; and, means coupled to said gas reservoir for varying the inert gas pressure therein and varying the switching point from said first state to said second state.

* * * * *